United States Patent [19]
Rink et al.

[11] Patent Number: 5,496,062
[45] Date of Patent: Mar. 5, 1996

[54] LIQUID-FUELED DEVICE TO COMBINE THE FUNCTIONS OF A LOW PRESSURE SWITCH (LPS), SQUIB, AND GAS GENERATOR

[75] Inventors: Karl K. Rink, Liberty; Marcus T. Clark, Kaysville, both of Utah

[73] Assignee: Morton International, Inc., Chicago, Ill.

[21] Appl. No.: 392,633

[22] Filed: Feb. 21, 1995

Related U.S. Application Data

[63] Continuation-in-part of Ser. No. 197,627, Feb. 16, 1994, Pat. No. 5,429,387.

[51] Int. Cl.$^6$ .............................. B60R 21/26; H01H 35/34
[52] U.S. Cl. .................. 280/737; 280/741; 102/202.5; 102/202.14; 200/83 A; 200/83 Y
[58] Field of Search .................... 280/737, 741, 280/736, 740, 735; 102/202.5, 202.7, 202.14, 530, 531; 200/83 R, 83 A, 83 N, 83 P, 83 Y, 61.08; 73/716, 717, 719, 723, 725

[56] References Cited

U.S. PATENT DOCUMENTS

| | | | |
|---|---|---|---|
| 3,232,481 | 2/1966 | Hebenstreit | 222/3 |
| 3,552,770 | 1/1971 | Berryman | 280/740 |
| 3,655,217 | 4/1972 | Johnson | 280/737 |
| 3,756,621 | 9/1973 | Lewis et al. | 280/741 |
| 5,016,914 | 5/1991 | Faigle et al. | 280/741 |
| 5,033,772 | 7/1991 | Frantom et al. | 280/737 |
| 5,060,973 | 10/1991 | Giovanetti | 280/741 |
| 5,225,643 | 7/1993 | Marchant | 200/83 Y |
| 5,290,060 | 3/1994 | Smith | 280/737 |
| 5,429,387 | 7/1995 | Clark et al. | 280/737 |

FOREIGN PATENT DOCUMENTS 2330194 12/1974 Germany.

*Primary Examiner*—Margaret A. Focarino
*Assistant Examiner*—Peter C. English
*Attorney, Agent, or Firm*—Gerald K. White

[57] ABSTRACT

Featured for use with a hybrid air bag inflator containing inert stored gas under high pressure is a liquid fueled construction which combines the functions of an initiator, gas generator, and differential low pressure switch into a single device. Instead of being filled with a mixture of combustible gases, the device is filled with a combination of gases and liquids. Alternatively, it makes use of a hybrid squib in conjunction with different combinations of gases and liquids. A pyrotechnic material is used to ignite the mixture regardless of the combination of fuel and oxidant used in the device. A ceramic body is used to house the device. Upon combustion of the mixture, the ceramic body ruptures violently, permitting efficient transfer of the explosive energy to the inert stored gas in the hybrid inflator.

23 Claims, 5 Drawing Sheets

LIQUID-FUELED DEVICE TO COMBINE THE FUNCTIONS OF A LOW PRESSURE SWITCH (LPS), SQUIB, AND GAS GENERATOR

CROSS REFERENCE TO RELATED APPLICATION

This application is a continuation-in-part of a previous application filed in the United States Patent and Trademark Office by Marcus T. Clark and Brent R. Marchant on Feb. 16, 1994 entitled "LOW PRESSURE SWITCH/INITIATOR/GAS GENERATOR" and assigned Ser. No. 08/197,627, U.S. Pat. No. 5,429,387. The parent application is hereby incorporated by reference herein and is made part hereof, including but not limited to those portions which specifically appear hereinafter.

BACKGROUND OF THE INVENTION

1. Field of the Invention

This invention relates to combining the functions of an initiator, gas generator/heater and a "low pressure switch" (LPS) into a single device for convenience, termed herein an "initiator/monitor" device and having especial utility in the inflator of a vehicular stored gas inflatable air bag safety restraint system. A stored gas system includes a gas generator for the generation of gas and a vessel in which compressed or pressurized gas is stored to supply additional gas under pressure to inflate an inflatable air bag to protect the occupants of a vehicle upon the impact thereof with a harm producing object.

2. Description of the Prior Art

An inflatable air bag has a folded condition for storage in a steering wheel, dashboard or other appropriate location within a vehicle in close proximity to normal occupant position. Upon the occurrence of a collision of the vehicle, expansion of the inflatable bag may be effected or augmented by an inflator comprising a fluid supply in the form of a pressure vessel defining a chamber which contains a stored compressed or pressurized supply of gas.

In U.S. Pat. No. 5,290,060 granted on Mar. 1, 1994 to Bradley W. Smith entitled "HYBRID GAS GENERATOR FOR AIR BAG INFLATABLE RESTRAINT SYSTEMS" and assigned to the assignee of the present invention, a pressurized stored gas supply in a pressure vessel is released upon the actuation of a gas generator, more particularly, a pyrotechnic heater, which heats and increases the pressure of the stored gas. This causes the rupture of a portion of the pressure vessel which communicates with suitable gas flow directing means leading to and allowing the gas to escape into the interior of an inflatable bag. The bag inflates in front of the occupant and acts as a protective cushion.

The compressed or pressurized supply of gas is a very important part of a hybrid safety restraint system. If the gas pressure falls below a predetermined level, the system will not operate properly.

The pressurized vessel typically is compressed or pressurized with an inert gas such as argon, or a mixture of argon and another inert gas, to approximately 3000 psi at room temperature. Such vessels must be adapted to maintain the stored gas pressure so that the pressure does not drop by more than about 200 psi when at room temperature during the life of the vehicle which may be fifteen (15) years or more. These limits are illustrative only and are not intended in any manner to place restrictions on the scope of the claimed invention.

In a compressed or pressurized gas air bag inflation system, a means of predictably and substantially instantaneously releasing the pressurized gas from the inflator to fill the air bag is required. In addition, it may be desirable to heat the gas at the time of release to increase the pressure and/or improve the air bag inflation characteristics. Most domestic car manufacturers currently also require a temperature compensated means of detecting if a substantial amount of the compressed or pressurized gas has leaked from the inflator during the lifetime of the inflator.

Current hybrid air bag inflators use a "low pressure switch" to indicate the adequacy of the volume of gas stored in the inflator, an initiator (squib), a gas generator, and additional pyrotechnic material to heat the "cold" gas stored in the pressure vessel. There is a need and a demand for the replacement of the above components with one, cost effective, small device to reduce the complexity and cost of the inflator assembly. The present invention was devised to fill the gap that has existed in the art in this respect.

SUMMARY OF THE INVENTION

An object of the invention is to combine the functions of an initiator, gas generator/heater, and a low pressure switch into a single device.

Another object of the invention is to provide in a single device a combination LPS/initiator/gas generator for a compressed gas air bag inflator.

Still another object of the invention is to provide in a single device the initiation train and pressure differential switch of the inflator of a hybrid inflatable air bag safety restraint system to reduce, for example, the cost, size and weight, with the pressure monitoring function being added to the initiating train at little cost.

A further object of the invention is to provide such a device that is characterized by the incorporation therein of a temperature compensating means for detecting whether any compressed or pressurized gas has leaked from the inflator during the lifetime of the inflator.

Another object of the invention is to provide a liquid-fueled device having utility in a hybrid-type inflator assembly in which the functions of a low pressure switch, squib and gas generator are combined into a single device.

A further object of the invention is to provide a liquid-fueled device that incorporates the squib and gas generator functions into the low pressure switch to reduce the cost and complexity of a hybrid-type inflator assembly.

In accomplishing these and other objectives of the invention the device utilizes the basic structure of the "DIFFERENTIAL PRESSURE SWITCH FOR STORED GAS PRESSURE VESSEL" disclosed in U.S. Pat. No. 5,225,643 granted on Jul. 6, 1993 to Brent R. Marchant and assigned to the assignee of the present invention. The device detects the adequacy of pressure in the pressure vessel and acts as an ignition train initiator by the incorporation of an oxidizer (solid or gas) and a fuel (solid or gas) within the device. For example, the device may have a combustible gas in an inner chamber, the pressure temperature curve of which combustible gas matches that of the compressed gas in an outer chamber. The outer chamber, for example the chamber of a pressure vessel of a hybrid air bag inflator in which the device is positioned, may contain a combustible or inert gas, depending upon the energy release needed. Monitor electric current for the air bag restraint system flows through a pressure monitoring resistor and a bridgewire ignition initiating resistor within the device, monitoring continuity. When and if the pressure in the outer chamber decreases below a preset threshold value, the pressure monitoring circuit breaks continuity. Thus, a resistance change occurs in a circuit in which the pressure monitoring and bridgewire resistors are connected, which circuit is connected to a diagnostic unit. The switch acts as a low pressure switch when the pressure inside the switch is set such that it forces two diaphragms together, completing an electrical circuit including the pressure monitoring resistor when there is sufficient pressure in the hybrid inflator for proper air bag inflation. A pressure drop in the inflator causes the diaphragms to be forced apart opening the electrical circuit through the pressure monitoring resistor.

The bridgewire resistor inside the low pressure switch body preferably has a resistance value higher than or comparable to that of the pressure monitoring resistor and never loses continuity until it has performed as expected or operated properly, that is, functioned. The two circuits connecting the bridgewire resistor and the pressure monitoring resistor are connected in parallel and the continuity of both of the resistor circuits is continuously measured externally by a suitable diagnostic unit by running a small or low current through the two low pressure switch pins and measuring the overall resistance. For example, if the pressure monitoring resistor is 100 ohms and the bridgewire resistor is 50 ohms, the external diagnostic circuitry would measure 1/(1/100+1/50)=33 ohms. If the pressure monitoring resistor lost continuity due to pressure loss in the inflator, the resistance measured by the diagnostic unit would change to 50 ohms (the resistance of the bridgewire circuit alone) and the diagnostic unit would detect that the low pressure switch had lost continuity. If the bridgewire resistor somehow became disconnected, the resistance would change to 100 ohms (the resistance of the pressure monitoring resistor alone) and the diagnostic unit would detect this also. Under normal operating conditions, both circuits would be closed and 33 ohms would be measured at all times. In the event of a vehicular collision, the diagnostic unit would apply a large current through the low pressure switch pins, causing the bridgewire resistor to heat to a predetermined level to ignite the solid material or explosive gas(es) in the initiator/monitoring device. If needed, the pressure monitoring resistor could have a fuse incorporated therewith to break continuity immediately upon application of the large current so as not to interfere with the operation of the bridgewire resistor ignition. When ignited, the gas inside the low pressure switch body expands and ruptures at least one pressure disc in the wall of the low pressure switch body, allowing the hot gas to mix with the stored gas(es) in the inflator and to ignite or expand it/them. This, in turn, builds up enough pressure to cause a diaphragm restraining the stored inflator gas to rupture, allowing that gas to vent or escape into the air bag and to inflate it.

In another embodiment of the invention, a liquid-fueled device incorporates a squib (pyrotechnic initiator) and gas generator functions into the low pressure switch. This embodiment is similar to that described above, but incorporates a liquid rather than a gaseous fuel, and a pyrotechnic initiator rather than a hot wire or spark-discharge system. The function of this embodiment of the invention, as it relates to a typical hybrid inflation system, consists of two parts. First, it is designed to sense when the stored inert gas in the inflator falls below a predetermined value deemed to be unacceptable. Second, upon ignition of the squib (or pyrotechnic) initiator, the flammable mixture stored within the device ignites and causes the external wall of the device to rupture violently. Since the external wall of the liquid-fueled device is in direct contact with the inert gas storage chamber of the hybrid inflator, the hot, high pressure gases produced by combustion of the stored mixture immediately mix with the stored inert gas. In this manner, the pressure of the inert gas is raised such that a thin rupture disc used to contain the mixture ruptures, allowing the gas mixture to escape or vent into an air bag to inflate it. The initiator/low pressure device is physically sized such that sufficient energy is transferred to the stored inert gas to cause the pressure thereof to rise enough to cause the rupture disc to fail.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DESCRIPTION OF THE PREFERRED EMBODIMENT

Referring to the drawings, there is shown a hybrid inflator assembly 10 for inflating a vehicle occupant restraint such as an air bag (not shown). The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated cylindrical sleeve 16. A fill plug 18 is attached by a circumferential weld 20 in sealing relation to a first end 22 of sleeve 16. An initiator/monitor device 24 according to the invention is recessed in sealing relation into chamber 14 from a second end 26 of sleeve 16. A diffuser 28 extends at substantially a 90° angle from the exterior surface 30 of sleeve 16 at a location intermediate the ends 22 and 26 thereof. Diffuser 28 is arranged in sealing relation with sleeve 16 and provides a passage for the flow of gas from pressure chamber 14 through one or more normally closed constricting orifices 32 that are provided in the wall of sleeve 16.

The initiator/monitor device 24 includes a chamber 34 which is pressurized to a predetermined reference or control level. The chamber 34, which is hermetically sealed, is defined by two mirror symmetrical electrically conductive flexible diaphragms 36 and 38. Each of the diaphragms 36 and 38 may have a raised surface 40 and 42, respectively, as shown, in the central region thereof. Adapted for electrical connection between the raised surfaces 40 and 42 is a resistor 44 which may have a value of 100 ohms and serves a low pressure switch monitoring function. Resistor 44 is adapted to make and break contact with the diaphragm raised surfaces 40 and/or 42 as the diaphragms 36 and 38 move toward and away from each other from a predetermined spaced relation.

Figure 7:
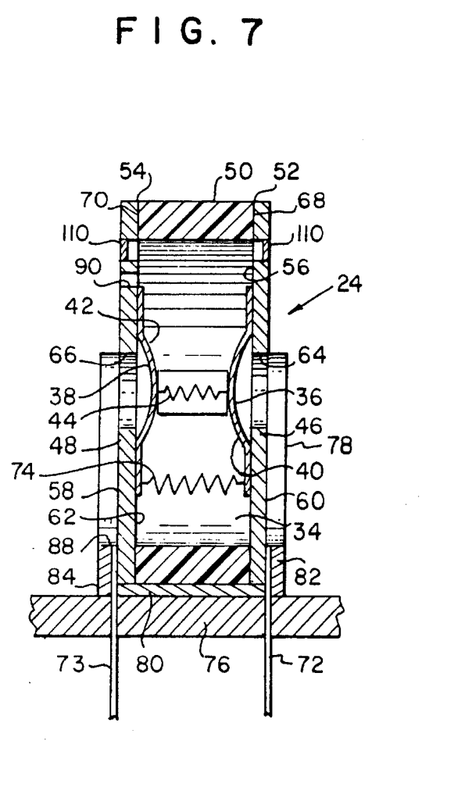
FIG. 7 is a cross-sectional view of the initiator/monitor device taken along the lines 7—7 of FIG. 6.

When the pressure inside the chamber 34 defined by the diaphragms 36 and 38, as illustrated in FIG. 7, is set such that it forces the diaphragms 36 and 38 toward each other completing a circuit through the resistor 44, there is sufficient pressure of stored gas in the vessel 12 for proper inflatable bag inflation. A pressure drop of the stored gas in the vessel 12 forces the diaphragms 36 and 38 apart, opening the circuit through the resistor 44.

The diaphragms 36 and 38 which, typically, may be made out of stainless steel or other suitable material including inconel and carbon steel, are physically positioned in parallel relation to each other. Each of the diaphragms 36 and 38, termed first and second diaphragms, respectively hereinafter, is attached in a symmetrical manner, as by brazing, in sealing relation to a respectively associated electrically conductive protective ring or washer 46 and 48. The protective rings 46 and 48, in turn, are mounted in spaced relation to each other on the opposite sides of an electrically non-conductive spacer ring or washer 50, being hermetically sealed thereto by suitable sealing means indicated at 52 and 54, respectively. Alternatively, the diaphragms 36 and 38 may be attached directly to the electrically non-conductive spacer ring 50 and backed up with the protective rings 46 and 48 or another suitable backing method.

More specifically, each of the protective rings 46 and 48 has a first side 56 and 58, respectively, and a second side 60 and 62, respectively. The first diaphragm 36 is attached in sealing relationship to the first side 56 of the first protective ring 46, symmetrically with respect to an aperture 64 in the ring 46. The second diaphragm 38 is attached in sealing relationship to the second side 62 of the second protective ring 48, symmetrically with respect to an aperture 66 in the ring 48. The first side 56 of the first protective ring 46 is disposed in sealing relationship with a first side 68 of the spacer ring 50. The second side 62 of the second protective ring 48 is disposed in sealing relationship with the second side 70 of the spacer ring 50.

The arrangement is such that the diaphragms 36 and 38 are positioned so that the surfaces 40 and 42, which may or may not be raised, are directly opposed. Apertures or openings 64 and 66 in the protective rings 46 and 48, respectively, allow external pressure, that is, the pressure outside of the chamber 34, specifically the pressure of the pressurized or compressed gas that is stored in the pressure vessel 12, to act on the diaphragms 36 and 38.

Electrical leads from the protective rings 46 and 48 are attached to pins or lead wires 72 and 73, respectively, through a header 76. To that end, each of the pins 72 and 73 may be welded to a respectively associated one of the protective rings 46 and 48.

Positioned in the chamber 34 adjacent the connection of the pins 72 and 73 to the protective rings 46 and 48, respectively, and extending between the protective rings 46 and 48, to each of which is permanently connected, is a bridgewire initiator resistor 74. The value of resistor 74 may be 50 ohms.

A suitable housing 78 may be provided to protect the initiator/monitor device 24. The housing 78 includes a base 80 and parallel vertical walls 82 and 84 that are spaced to receive the assembled diaphragms 36 and 38, the protective rings 46 and 48 and the spacing ring 50 in a snug fit. Cutouts 86 and 88 in the housing 78 expose a substantial portion of each of the protective rings 46 and 48 including the apertures 64 and 66 therein, respectively.

Figure 1:
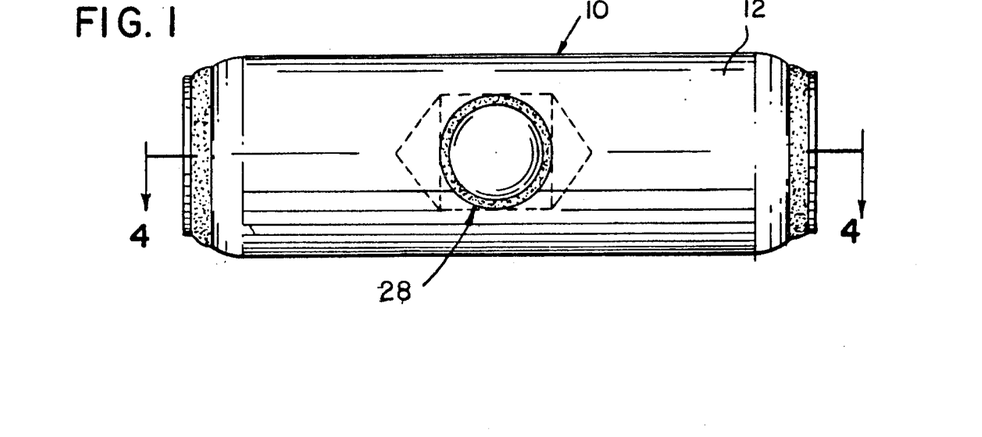
FIGS 1, 2 and 3 are front, side and end views, respectively, illustrating a hybrid inflator.
Figure 2:
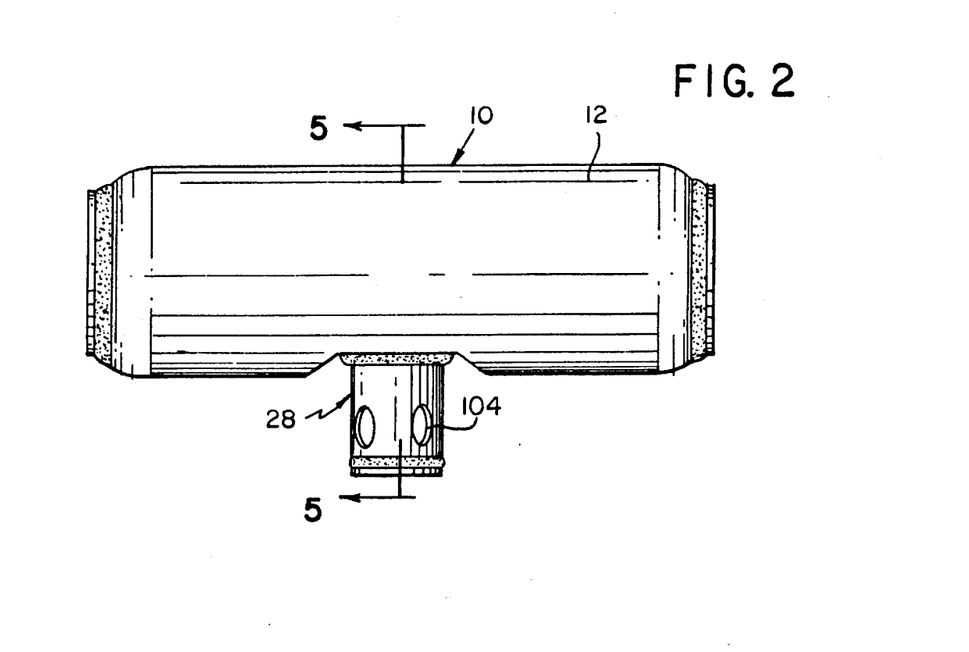
Figure 3:
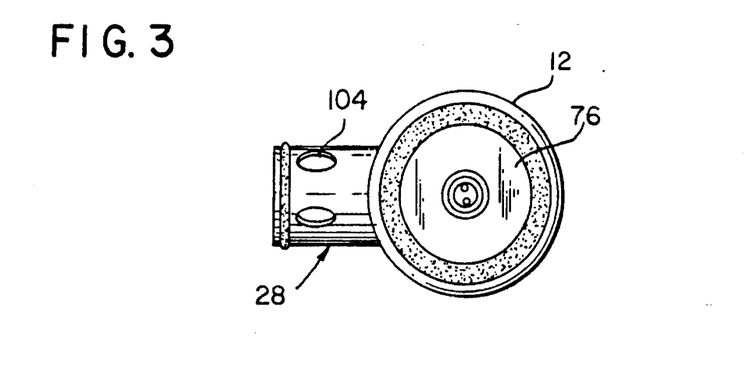
Figure 4:
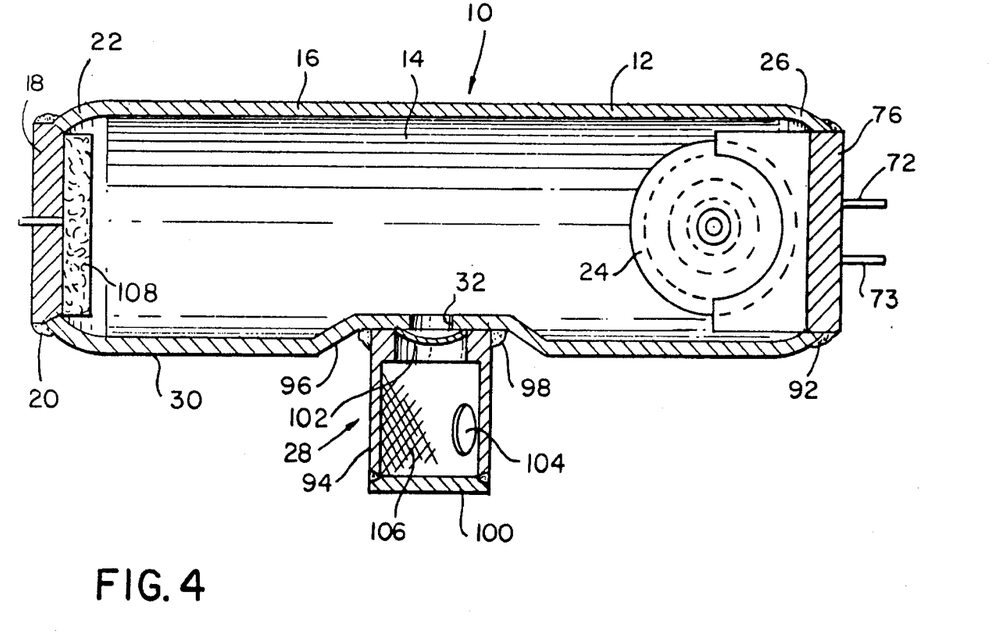
FIG. 4 is a cross-sectional view of the hybrid inflator taken along the lines 4—4 of FIG. 1.
Figure 5:
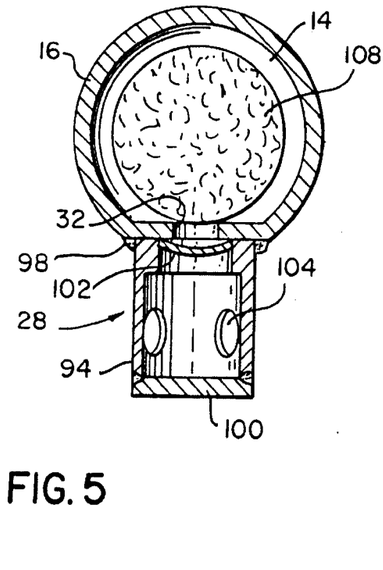
FIG. 5 is a cross-sectional view taken along the lines 5—5 of FIG. 2.

The header 76, as best seen in FIG. 4, mates with the second end 26 of the cylindrical sleeve 16 of the pressure vessel 12. The sleeve 16 and the adjacent outer region of the header 76 are joined in sealing relation by a circumferential weld 92.

Pressurization of the chamber 34 of the initiator/monitor 24 may be effected in a pressurized atmosphere of a combination of combustible gases whose pressure/temperature curve substantially matches that of the compressed gas in the storage chamber 14 during assembly of the diaphragms 36 and 38 to protective rings 46 and 48, respectively associated therewith, and to the spacer ring 50. No fill ports are required when the chamber 34 is pressurized during the assembly process. Optionally, pressurization may be effected through a fill port 90 provided in protective ring 48. Upon charging or pressurizing the chamber 34 to the desired pressure level through the fill port 90, the latter may be closed off in any suitable manner. Pressurizing the chamber 34 does not involve penetration of the wall of the diaphragms 36 and 38. This is for the reason that the diameter of the protective rings 46 and 48, as shown, is sufficiently greater than that of the diaphragms 36 and 38 to allow access to the chamber 34 from the outside through the protective rings 46 and 48 alone. Alternatively, the chamber could be pressurized through a hole in the diaphragm and closed off using any suitable method.

When the diaphragms 36 and 38 are pressurized internally, as herein disclosed, with low pressure on the outside, that is, externally of the chamber 34, the diaphragms 36 and 38 are forced apart by the internal pressure in chamber 34. When the diaphragms 36 and 38 are pressurized externally, the diaphragms are caused to move closer together.

In accordance with the invention, the reference or control pressure level to which the chamber 34 is selected to be pressurized typically is lower by about 200–300 psi than that of the stored gas in the pressure vessel 12 which is to be monitored by the initiator/monitor device 24.

Diffuser 28 comprises a generally cylindrical sleeve 94 that is joined at one end to the sleeve 16, at a depressed portion 96 of the surface 30 thereof in which the orifice 32 is provided, by a circumferential weld 98. The other end of sleeve 94 is joined to and sealed by a gas impervious closure plate 100. A thin metal diaphragm 102, referred to hereinafter as a third diaphragm, provides a seal for orifice 32 in the wall of sleeve 16 which defines storage chamber 14. Provided in sleeve 94 of diffuser 28 are a plurality of orifices 104 for dispensing inflating gas uniformly from chamber 14 into an air bag assembly (not shown).

A coarse screen or perforated metal sheet indicated at 106 is provided in the diffuser 28 to cover the diffuser orifices 104 to prevent fragments of the diaphragms from entering the air bag assembly. If filtering is desired, the coarse screen 106 could be replaced with a filter assembly of wraps of metal and/or ceramic fiber materials which are common in the art.

Further filtering may be achieved by placing impingement filter material indicated at 108 on the inside surface of the fill port and plug 18 opposite the initiator/monitor 24. Filter 108 would be made with woven or matted metal and/or ceramic fibers which functions by providing a large surface area upon which liquid phased particulates entrained in the impinging gases may condense.

In the operation of the hybrid gas generator, upon the receipt of an electric signal indicative of the onset of a crash and a need for inflation of an air bag (not shown), a diagnostic unit (not shown) supplies a large current through the pins 72 and 73, causing the bridgewire resistor 74 to ignite the gas in the chamber 34 of the initiator/monitor device 24. When ignited the gas in chamber 34 explodes and ruptures pressure discs 110 in the wall members 46 and 48 of the initiator/monitor device 24, allowing the hot gas to mix with the stored gas in chamber 14 of the pressure vessel 12. This heats the stored gas in vessel 12 causing a rapid pressure rise in the chamber 14.

When the pressure of the stored gas exceeds the structural capability of the thin metal diaphragm 102 in the diffuser 28, the diaphragm 102 ruptures allowing the heated stored gas to vent through the orifice 32 and the diffuser orifices 104 into the inflatable bag assembly. Between the diffuser diaphragm 102 and the storage chamber 14 are one or more constricting orifices 32 which throttle the flow of gas from the storage chamber 14, providing the proper fill rate to the air bag. The coarse screen or perforated metal sheet 106 prevents fragments of the initiator/monitor 24 and diaphragm 102 from entering the air bag assembly. Impingement filter 108 on the fill port and plug 18 provides further filtering by condensing thereon liquid phase particles entrained in the impinging gases.

In a first embodiment of the invention, the initiator/monitor device 24 acts as an ignition train monitor by the incorporation of an oxidizer gas and a fuel gas, for example, methane, within the internal chamber 34 and with an inert stored gas such as argon or nitrogen contained in the outer chamber 14 within the pressure vessel 12.

In a second embodiment of the invention, it is contemplated that the outer chamber 14 may contain a combustible gas depending upon the energy release needed.

Figure 9:
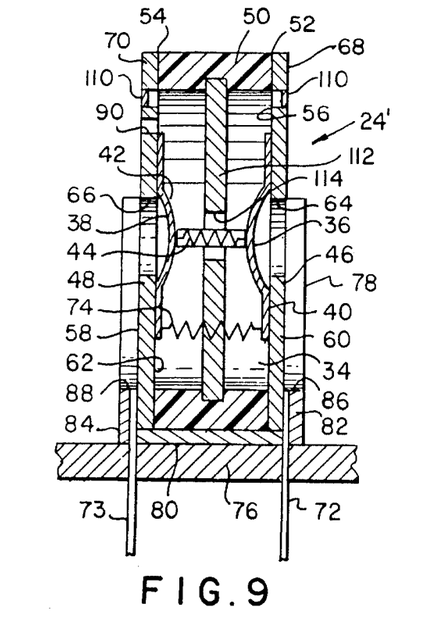
FIGS. 9 and 10 are fragmented disclosures of modified initiator/monitor devices according to the invention.

In a third embodiment of the invention, as illustrated in FIG. 9, the oxidizer in the internal chamber 34 of the device 24 is in the form of a solid disc.

Figure 10:
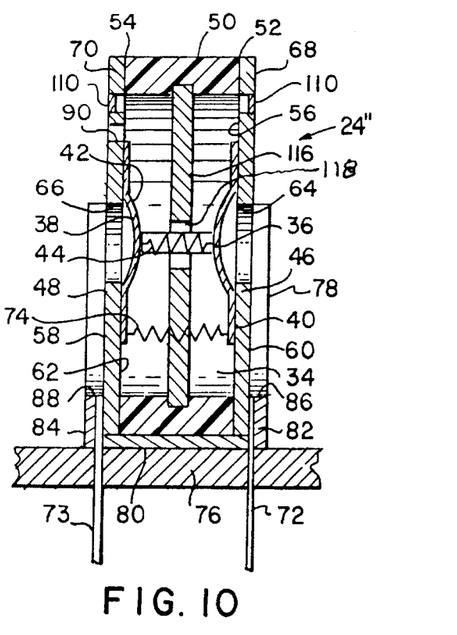

In a fourth embodiment of the invention, as illustrated in FIG. 10, the pyrotechnic fuel in the internal chamber 34 of the device 24 is in the form of a solid disc.

Figure 6:
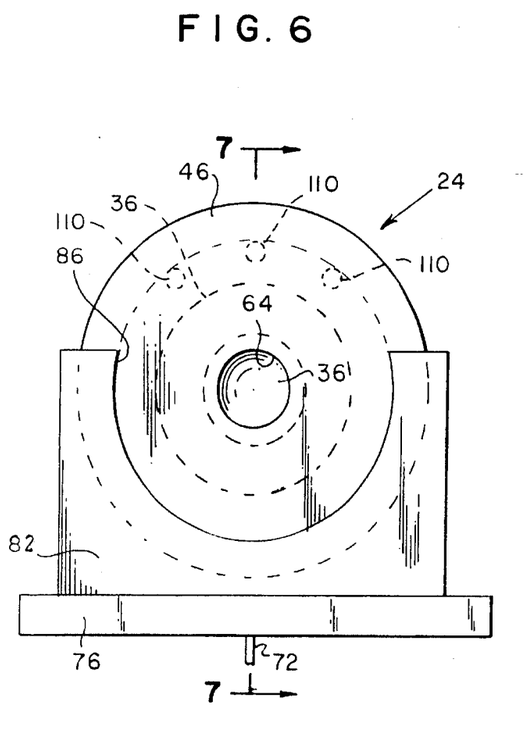
FIG. 6 is a front view of the initiator/monitor device of FIG. 4.

As shown in FIG. 9, the initiator/monitor device 24' differs from the device 24 shown in FIGS. 6 and 7 by the inclusion of a perforated oxidizer disc 112 that is supported between the diaphragms 36 and 38 internally of a non-conductive spacer ring 50' in the inner chamber 34 with the low pressure switch resistor 44 extending through an aperture 114 in the disc 112. The device 24' has combustible gas in the inner chamber 34. The outer chamber 14 has a gas which may or may not be combustible. The monitor current flows through the pressure monitoring resistor 44 and the bridgewire resistor 74, monitoring continuity. When and if the pressure in the outer chamber 14 decreases below a threshold value, the resistor 44 breaks continuity and there is a resistance change. If the air bag is to deploy, the bridgewire resistor 74 heats up to a point that the combustible gas and the oxidizer disc 112 combust. This ruptures the pressure discs 110 and heats the gas in the outer chamber 14. The outer chamber ruptures and gas flows through diffuser 28 into the air bag (not shown).

The initiator/monitor device 24" shown in FIG. 10 differs from the device 24 shown in FIG. 7 by the inclusion in the inner chamber 34 of a perforated fuel disc 116. The disc 116 is supported between the diaphragms 36 and 38 internally of the non-conductive spacer ring 50' with the low pressure switch resistor 44 extending through an aperture 118 in the disc 116. Thus, the switch/initiator or igniter/generator 24" need not use a combustible gas. For the function of the switch, it is preferred to use the same gas in the inner chamber 34, that is, internally of the device 24", as is used in the external chamber 14 in order that the detection of whether any of the pressurized gas in the inflator has leaked therefrom may be temperature compensated.

Thus, in accordance with the four embodiments of the invention disclosed in FIGS. 1–10, there has been provided in a single size, weight and cost effective device a low pressure switch/initiator/gas generator for a compressed gas air bag inflator, with the pressure monitoring function being added to the initiation train at little cost. Incorporating the initiator and gas generator functions into the differential pressure low pressure switch reduces the cost and complexity of the inflator assembly.

Figure 11:
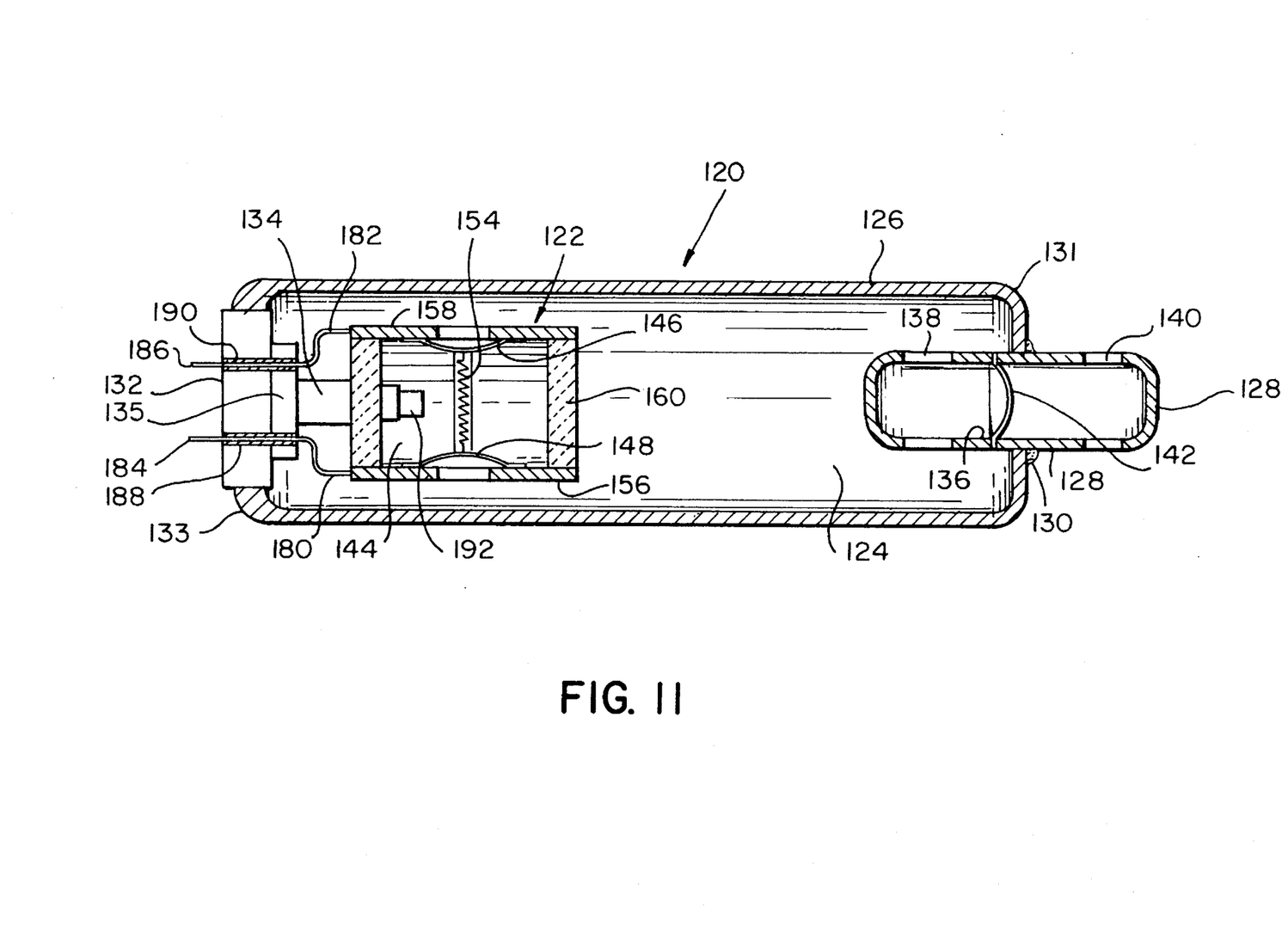
FIG. 11 is a side view illustrating a hybrid inflator having a single liquid-fueled device that incorporates a squib (or pyrotechnic) initiator and gas generator functions in the low pressure switch.

In FIG. 11 there is shown another configuration of the hybrid inflator assembly, designated 120, that includes an initiator/monitor comprising a single liquid filled device 122 that incorporates the squib (pyrotechnic) initiator and gas generator functions into a low pressure switch.

The inflator assembly 120 comprises a pressure vessel including an inert gas storage chamber 124 that is filled and pressurized with an inert gas such as argon, usually at a pressure of about 3200 psi. Chamber 124 is defined by an elongated cylindrical sleeve 126. An outlet member or diffuser 128 is attached by a circumferential weld 130 to one end 131 of sleeve 126. At the other end 133 thereof, the sleeve 126 is suitably closed by an end plug 132.

The single liquid filled device 122 is attached, internally of chamber 124, to the end plug 132 by a suitable support post 134 and a header 135.

The diffuser 128 includes an axial bore 136 that is closed at both ends. Being normally arranged in sealing relation of chamber 124 with sleeve 126, the diffuser 128 provides, upon initiation of the hybrid inflator assembly 120, a fluid flow passage to an air bag (not shown) to be inflated from the chamber 124 through a plurality of constricting orifices.

Communication between the bore 136 and the chamber 124 interiorly of sleeve 126 is by way of a plurality of orifices 138 that are provided in the wall of the portion of the diffuser 128 that is located within the chamber 124. A plurality of orifices 140 in the portion of the wall of the diffuser 128 that is located exteriorly of the chamber 124 provide communication between the bore 136 and the air bag (not shown). Communication in the bore 136 between the plurality of orifices 138 and 140 is normally prevented by means of a rupturable disc 142.

Figure 12:
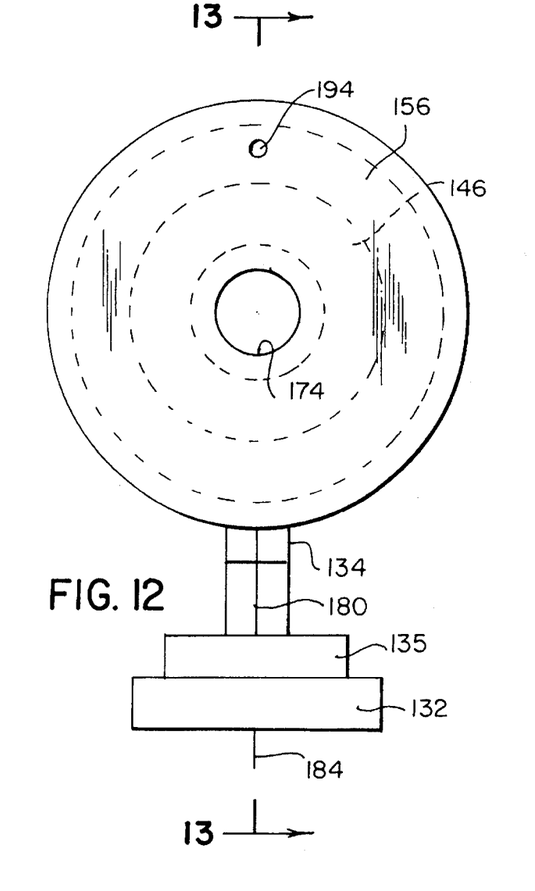
FIG. 12 is a front view of the liquid-fueled device of FIG. 11.
Figure 13:
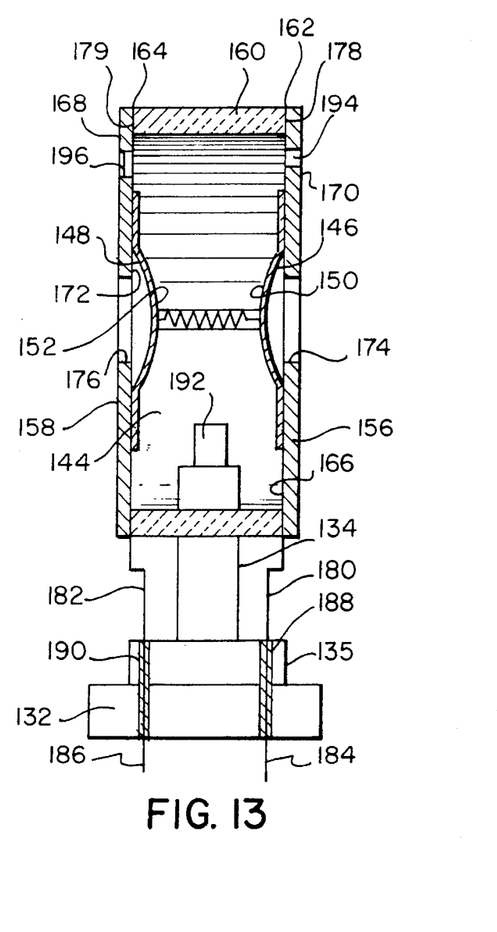
FIG. 13 is a cross-sectional view of the liquid-fueled device of FIG. 12 taken along the lines 13—13 of FIG. 12.

The single liquid filled device 122 includes a combustion chamber 144 which is pressurized to a predetermined reference or control level. The combustion chamber 144 which is hermetically sealed is defined by two mirror symmetrical electrically conductive diaphragms 146 and 148. Similarly to the diaphragms 36 and 38 shown in FIGS. 7, 8, 9 and 10, each of the diaphragms 146 and 148, as shown in FIGS. 12 and 13, may have a raised surface 150 and 152, respectively, as shown in FIG. 12, in the central region thereof. Adapted for electrical connection between the raised surfaces 150 and 152 is a monitoring resistor 154. Resistor 154 may have a value of 50 ohms and serves a low pressure switch monitoring function. Resistor 154 is adapted to make and break contact with the diaphragms 146 and 148 as the diaphragms 146 and 148 move toward and away from each other from a predetermined relation.

When the pressure in the combustion chamber 144 defined by the diaphragms 146 and 148 is set such that it forces the diaphragms 146 and 148 toward each other completing a circuit through the resistor 154, there is sufficient pressure for the stored gas in the chamber 124 for proper inflation of the inflatable bag. A pressure drop in the stored inert gas in the vessel 126 forces the diaphragms 146 and 148 apart and opens the circuit through the resistor 154.

The diaphragms 146 and 148 which, typically, may be made out of stainless steel or other suitable material including inconel and carbon steel, are positioned in parallel relation to each other. Each of the diaphragms 146 and 148, termed first and second diaphragms, respectively, is attached in a symmetrical manner, as by brazing, in sealing relation to a respectively associated electrically conductive protective plate, ring or washer 156 and 158. The protective plates or rings 156 and 158, in turn, are mounted in spaced relation to each other on the opposite sides of an electrically non-conductive spacer ring 160, being hermetically sealed thereto by suitable sealing means indicated at 162 and 164, respectively. Alternatively, the diaphragms 146 and 148 may be attached directly to the electrically non-conductive spacer ring 160 and backed up with the protective rings 156 and 158 or another suitable backing method.

More specifically, each of the protective rings 156 and 158 has a first side 166 and 168, respectively, and a second side 170 and 172, respectively. The first diaphragm 146 is attached in sealing relationship to the first side 166 of the first protective ring 156, symmetrically with respect to an aperture 174 in the ring 156. The second diaphragm 148 is attached in sealing relationship to the second side 172 of the second protective ring 158, symmetrically with respect to an aperture 176 in the ring 158. The first side 166 of the first protective ring 156 is disposed in sealing relationship with a first side 178 of the spacer ring 160. The second side 172 of the second protective ring 168 is disposed in sealing relationship with the second side 179 of the spacer ring 160.

The arrangement is such that the diaphragms 146 and 148 are positioned so that the surfaces 150 and 152, which may or may not be raised, are directly opposed. Apertures or openings 174 and 176 in the protective rings 156 and 158, respectively, allow external pressure, that is, the pressure outside of the combustion chamber 144, specifically the pressure of the pressurized or compressed gas that is stored in the inert gas chamber 124 to act on the diaphragms 156 and 158.

Electrical leads 180 and 182 from the protective rings 156 and 158 are attached to pins or lead wires 184 and 186, respectively, through the header 135 and the end plug 132. The pins 184 and 186 are welded to a respectively associated one of the protective rings 156 and 158. Pins 184 and 186 extend through header 135 and end plug 132 through respectively associated glass metal seals 188 and 190.

The initiator/monitor designated 122, comprising a single liquid filled device, is similar to the initiator/monitor devices 24, 24' and 24" that are illustrated in FIGS. 6–10, but incorporates a liquid rather than a gaseous fuel and a pyrotechnic initiator rather than a hot wire or spark discharge system. The device 122 is filled with a liquid hydrocarbon or hydrocarbon-derivative fuel (such as ethyl alcohol) stored under a high-pressure, oxidizing environment. The pressure and composition of the oxidant is controlled so that its thermal expansion characteristics closely resemble those of the stored, inert gas that is used to inflate the air bag (not shown). By way of example and not limitation, a mixture of oxygen and argon (with trace quantities of other diluents) stored in the initiator/monitor 122 at 2500 psi may be used as the oxidant. Trace species are included so that the thermal expansion characteristics of the oxidant can be tailored to be similar to those of the stored inert gas in the inert gas chamber 124.

Figure 8:
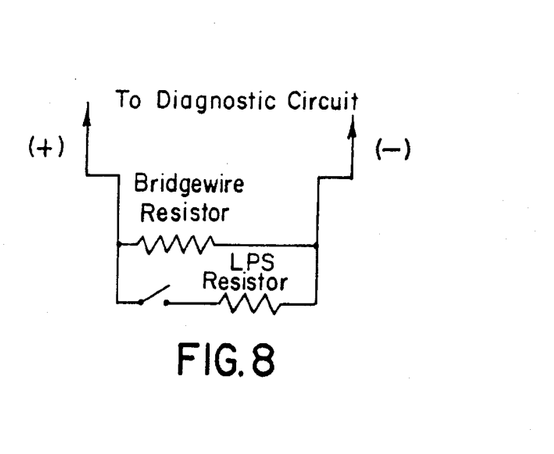
FIG. 8 is a circuit diagram illustrating the connection to a diagnostic unit of a bridgewire resistor and an LPS resistor provided in the initiator/monitor device.

Incorporated in the device 122 is a small pyrotechnic charge or a squib 192 that is operative in response to a predetermined high current input through the initiator pins 184 and 186 to cause the stored mixture in device 122 to ignite. Pins 184 and 186 extend through end plug 132 and header 135 through respectively associated glassmetal seals 188 and 190 and also are connected in circuit with the monitoring resistor 154. Resistor 154 is used in conjunction with the two flexible diaphragms 145 and 158 and a diagnostic circuit such as shown in FIG. 8 to indicate when the stored gas pressure in chamber 124 of inflator 120 is insufficient to properly inflate an air bag (not shown). The electrically non-conductive spacer ring 160 of the external wall of the device 122 ideally would be manufactured from a brittle material such as a suitable ceramic. The spacer ring 160 is required to offer adequate tensile strength to withstand the internal pressure of the flammable mixture stored therein, and enough compressive strength that it can withstand the differential pressure created by the difference in storage pressure between the external, inert gas in chamber 124 and the flammable gas internally thereof, usually 3200 psi and 2500 psi, respectively.

Upon combustion of the flammable mixture in device 122, the high internal pressures generated immediately causes brittle fracture of the ceramic body 160 with subsequent escape or venting of the combustion products into the stored, inert gas in chamber 124.

The external wall of the device 122 features a fill port 194 that may be similar to the fill port 90 shown in FIGS. 7, 9 and 10 so that liquid fuel can be added to the device 122 before it is filled with oxidant. The fill port 194, as shown in FIG. 13, may be provided in the electrically conductive spacer ring 156.

The body of the device 122 can, if desired, incorporate a rupture disc 196, as shown in FIG. 13, or a scored surface area (not shown) such that the external wall of the device 122 fails in a specific location. With these arrangements, the combustion products flow into the stored inert gas in the chamber 124 through, effectively, an orifice.

Thus, the invention embodiment illustrated in FIGS. 11, 12 and 13 is similar to the invention embodiments illustrated in FIGS. 6, 7, 8, 9 and 10, but it embodies a liquid (rather than gaseous) fuel and a pyrotechnic initiator rather than a hot wire or spark-discharge system. The function of the embodiment of FIGS. 11, 12 and 13 of the invention is twofold in that it senses when the stored, inert gas in the chamber 124 of the inflator 120 falls below a predetermined value that is deemed to be acceptable, and additionally, upon initiation of the pyrotechnic initiator, the flammable mixture stored within the device 122 ignites and causes the external wall 160 thereof to rupture violently. Since the external wall 160 of the device 122 is in direct contact with the inert gas storage chamber 124 of the inflator 120, the hot high-pressure gases produced by combustion of the stored mixture immediately mix with the stored inert gas. In this manner the pressure of the inert gas in the inert gas chamber 124 is raised such that the thin rupture disc 142 used to contain the mixture ruptures. This allows the gas mixture to vent into an air bag assembly (not shown). The single liquid filled device 122 is physically sized such that sufficient energy is transferred to the stored inert gas to cause its pressure to rise enough to cause the rupture disc 142 to fail.

As envisioned and disclosed in the embodiment of the invention illustrated in FIGS. 11–13, the liquid fuel in the single liquid filled device 122 lies within the hermetically sealed combustion chamber 144. Depending upon the electrical resistance of the liquid fuel, there could be a possible liquid connection between the electrically energized support plates 156 and 158. If this was true, the liquid fuel would have to be substantially non-conductive or have a low electrical conductivity, that is, a high resistance. This may also be true of vaporous fuels. If the electrical conduction of the fluid was problematic the construction could be changed so that the liquid fuel is not in electrical contact with the electrically energized pins 184 and 186.

In this connection, as those skilled in the art will understand, the single liquid filled device 122 can make advantageous use of a hybrid squib disclosed in U.S. application for patent bearing Ser. No. 08/339,603, filed on Nov. 15, 1994 by Karl K. Rink et al., which application is assigned to the assignee of the present application.

Figure 14:
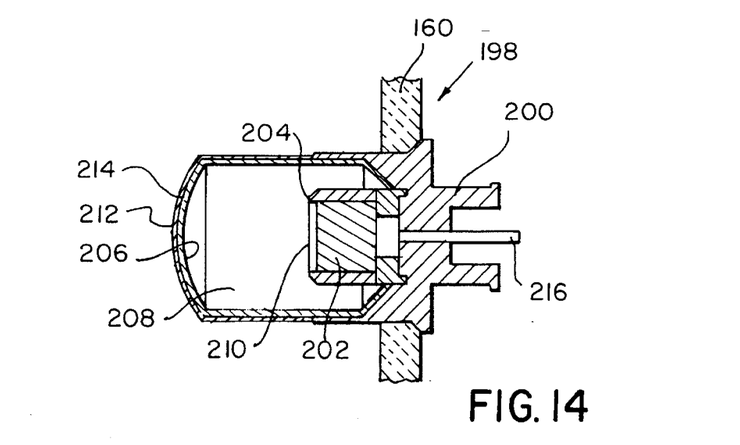
FIG. 14 is a side view of a hybrid squib featuring a supplemental charge of liquid fuel that is not directly exposed to the oxidizing environment.

This hybrid squib, designated 198, as shown in FIG. 14, includes a squib housing 200 which is suitably sealed to the spacer 160 of the device 122. A pyrotechnic charge 202 is contained in a pyrotechnic charge holder 204 that is sealed or welded to the squib housing 200. Surrounding the pyrotechnic charge holder 204 is a thin walled output can 206 that is sealed or welded to the squib housing 200 and which contains a liquid fuel charge 208. A suitable thin sealing separation 210 is provided to separate the pyrotechnic charge 202 and the liquid fuel charge 208. The material used for the output can 206 is chosen primarily by its resistance to chemical attack by the liquid fuel charge 208. To provide extra durability and protection, the cover 212 of the output can 206 can be covered by a suitable second substance 214. A number of materials, such as plastics and metals, can be used for constructing the output can 206 and cover 212.

Initiation of the hybrid squib is effected by applying an electric signal to an electrical pin 216 that extends through the squib housing 200 into the core pyrotechnic charge 202 that typically is found in conventional squib designs.

The hybrid squib 198 serves several purposes in the fluid-filled inflator. First, it keeps the liquid fuel out of contact with the electrically energized pins 184 and 186. Second, it provides a means for long-term storage of the liquid fuel used to drive the inflation process. The physical size of the liquid fuel output can 206 is chosen by the amount of energy needed to drive the inflation process through combustion of the liquid fuel. Third, it provides both an ignition source and a means of delivering atomized fuel into the combustion chamber 144 of the device 122.

In more detail, the function of the hybrid squib 198 is described as follows: upon receiving an electrical signal, the small core pyrotechnic charge 202 ignites and burns violently. The intense heat generated by this reaction is quickly transferred to the liquid fuel charge 208 along with the discharged mass emanating from the charge holder 204. The combination of these two effects quickly causes the internal pressure and temperature of the liquid fuel held within the output can 206 to rise dramatically such that the output can 206 and cover 212 rupture violently. As a result, the liquid fuel 208 is discharged into the combustion chamber 144 of the device 122. Ignition of the atomized liquid and oxidant mixture immediately occurs due to the presence of residual hot gas and particles created from combustion of the pyrotechnic charge. After this point, the inflation process occurs as previously described herein.

With this modification, the quantity of fuel (liquid or gaseous) stored in contact with the oxidant would be insufficient to allow combustion of the mixture under any ambient condition. Upon receiving an electrical signal, however, the hybrid squib 198 would ignite, discharging hot fuel and radiant particles into the body of the device 122. This fuel, in combination with any liquid fuel that is stored within the external wall or body of the device 122, would produce a mixture ideally suited for rapid combustion of the reactants.

Another variant of this invention is one which incorporates such a hybrid squib 198 entirely in that only an oxidant/inert gas mixture is stored within the body or external wall of the device 122. The advantage of this concept is that, since all of the fuel is contained in the initiator, specifically, the hybrid squib, the thermal expansion characteristics of the stored oxidant can be easily tailored to be similar to those of the inert gas stored in the inflator inert gas chamber 124. This is important for proper operation of the low pressure switch.

Thus, in accordance with the invention, there has been provided a liquid-fueled device to combine, in a single size, weight and cost effective device the functions of a low pressure switch, squib (pyrometer) and gas generator, with the pressure monitoring function being added to the initiation train at little cost. Incorporating the initiator and gas generator functions into the differential pressure switch reduces the cost and complexity of the inflator assembly.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A liquid-fueled device to combine the functions of a low pressure switch, squib and gas generator for a compressed gas air bag inflator comprising, first and second diaphragms each of which are electrically conducting, electrically non-conductive spacer means having a first side and a second side, attaching means attaching said first diaphragm and said second diaphragm in opposed and sealing relation to said first and second sides, respectively, of said spacer means thereby forming a hermetically sealed chamber, with said first diaphragm and said second diaphragm being movable toward and away from each other from a predetermined spaced relationship as the pressure of the environment externally of said hermetically sealed chamber increases and decreases relatively to the pressure in said hermetically sealed chamber, a liquid fuel normally stored under a high pressure oxidizing environment in said hermetically sealed chamber, a pyrotechnic initiator contained in said hermetically sealed chamber, said pyrotechnic initiator igniting in response to an electrical current of predetermined level thereto, a pressure monitoring resistor having first and second ends positioned so as to make and break electrical-contact with said first and second diaphragms as said first and second diaphragms are moved toward and away from each other from a predetermined spaced relation, and electrical circuit means to which said pressure monitoring resistor and said pyrotechnic initiator are connected, said electrical circuit means normally having a flow of electrical monitoring current therein which is too low to ignite said pyrotechnic initiator in said hermetically sealed chamber, but having a capability of having produced therein a flow of electrical current at a predetermined level high enough to cause initiation of said pyrotechnic initiator, whereby, with said hermetically sealed chamber pressurized to a predetermined reference level, in atmospheric environment conditions the pressure in said chamber is higher than atmospheric pressure and said first and second diaphragms are caused to move away from each other and thereby break the electrical contact of said pressure monitoring resistor and cause a change of resistance in said electrical circuit means, whereby with the pressure of the environment external to said hermetically sealed chamber higher by a predetermined amount than said predetermined reference level in said chamber, said first and second diaphragms are caused to move toward each other and cause said pressure monitoring resistor to make electrical contact with said diaphragms and cause a change of resistance in said electrical circuit means, whereby, if the seal of said hermetically sealed chamber fails, the resulting equalization of the chamber pressure and the pressure of the environment external to said chamber causes said first diaphragm and said second diaphragm to move away from each other and break the electrical contact of said pressure monitoring resistor and cause a change in the resistance of said electrical circuit means, and whereby with a flow of a large electrical current through said pyrotechnic initiator, that is, an electrical current at a level high enough to cause initiation thereof, said pyrotechnic initiator is initiated and ignites said liquid fuel in said hermetically sealed chamber.

2. A device as defined by claim 1 wherein said liquid fuel comprises a hydrocarbon or hydrocarbon-derivative fuel.

3. A device as defined by claim 2 wherein said liquid fuel is ethyl alcohol.

4. A device as defined by claim 1 wherein the thermal expansion characteristics of the oxidizing environment in said hermetically sealed chamber are similar to those of the gas external to said hermetically sealed chamber.

5. A device as defined by claim 4 wherein the gas external to said hermetically sealed chamber comprises a stored compressed inert gas in an air bag inflator.

6. A device as defined by claim 5 wherein said spacer means forms an external wall of said device and comprises a spacer ring made of a brittle material such as a ceramic that offers adequate tensile strength to withstand the internal pressure of the stored flammable mixture of said liquid fuel and said oxidizing environment and enough compressive strength that it can withstand the differential pressure created by the difference in storage pressure between the external, inert gas and that of the internal flammable mixture, whereby, upon combustion of said flammable mixture, the high internal pressure generated within said device immediately causes brittle fracture of said spacer ring with subsequent escape of the combustion products into the stored compressed inert gas in the air bag inflator.

7. A device as defined by claim 6 wherein said device includes a fill port so that the liquid fuel can be added to the device before it is filled with oxidant to produce the oxidizing environment in said hermetically sealed chamber.

8. A device as defined by claim 1 wherein said pyrotechnic initiator comprises a hybrid squib to aid in long-term storage of the flammable mixture, wherein the quantity of fuel, whether liquid or gaseous, stored in contact with the oxidant would be insufficient to allow combustion of the mixture during any ambient condition, but when initiated the hybrid squib would ignite, discharging hot fuel and radiant particles into said hermetically sealed chamber.

9. A device as defined by claim 8 which incorporates in said hybrid squib all of the fuel in said hermetically sealed chamber, whereby only an oxidant inert gas mixture is stored within said hermetically sealed chamber, thereby facilitating tailoring of the thermal expansion characteristics of the stored oxidant in said hermetically sealed chamber to those of the compressed inert gas in the air bag inflator.

10. A device as defined by claim 1, wherein said spacer means comprises a spacer ring, and wherein said attaching means includes first and second protective rings each of which has an aperture therein in a central portion thereof and has a first side and a second side, said first diaphragm being attached in sealing relationship to said second side of said second protective ring symmetrically with respect to the aperture therein, with the first side of said first protective ring being disposed in sealing relationship with the first side of said spacer ring and the second side of said second protective ring being disposed in sealing relationship with the second side of said spacer ring.

11. A device as defined by claim 10, wherein said first and said second diaphragms are attached to said first and second protective rings by mechanical bonding.

12. A device as defined by claim 10, wherein said first and said second protective rings are each electrically conductive.

13. A device as defined by claim 12 further including a separate electrical lead attached to each of said first and second protective rings.

14. A device as defined by claim 10, further including a pressure disc provided in at least one of said protective rings to rupture and allow the heated gases to flow out of said hermetically sealed chamber upon ignition of said pyrotechnic initiation.

15. A combination low pressure switch/initiator/gas generator device for an inflator of a hybrid inflatable air bag safety restraint system that includes a storage chamber containing stored inert inflation gas under high pressure comprising, an ignition train and pressure differential switch positioned in said storage chamber, said ignition train and differential switch comprising first and second diaphragms each of which is electrically conducting, electrically non-conductive spacer means having a first side and a second side, attaching means attaching said first diaphragm and said second diaphragm in opposed and sealing relation to said first and second sides, respectively, of said spacer means thereby forming a hermetically sealed chamber with said first diaphragm and said second diaphragm being movable toward and away from each other from a spaced relationship as the pressure in said inflator storage chamber increases and decreases relatively to the pressure in said hermetically sealed chamber, pyrotechnic means contained in said hermetically sealed chamber, said pyrotechnic means comprising a liquid fuel, a high pressure oxidizing environment, and squib means having a housing to effect ignition in said oxidizing environment of said fuel, a pressure monitoring resistor having first and second ends with said ends positioned so as to make and break electrical contact with said first and second diaphragms as said first and second diaphragms are moved toward and away from each other from a predetermined spaced relationship, and electrical circuit means to which said pressure monitoring resistor is connected when said ends of said pressure monitoring resistor are in electrical contact with said first and second diaphragms, said electrical circuit means being connected to said squib means for effecting initiation thereof but normally having a flow of electrical current therein which is too low to cause initiation thereof, but having a capability of having produced therein a flow of electrical current at a level high enough to cause immediate initiation of said squib means.

16. A device as defined by claim 15 wherein the external wall of said device includes a portion that is made of a brittle material such as a ceramic that offers adequate tensile strength to withstand the internal pressure of the stored flammable mixture of liquid fuel and said oxidizing environment and enough compressive strength that it can withstand the differential pressure created by the difference in storage pressure between the external inert gas and that of the internal flammable mixture, whereby, upon combustion of the flammable mixture, the high internal pressure generated within the device immediately causes brittle fracture of said external wall with subsequent escape of the combustion products into the stored inert gas under high pressure in the air bag inflator.

17. A combination as defined by claim 15 wherein said squib means comprises a hybrid squib having a core pyrotechnic charge contained in a pyrotechnic charge holder sealed to said squib housing, and an output can containing said liquid fuel and sealed to said squib housing.

18. A combination as defined by claim 17 wherein a sealing separation is provided on said hybrid squib to separate the core pyrotechnic charge and said liquid fuel.

19. A liquid-fueled device to combine the functions of a low pressure switch, squib and gas generator for a compressed gas air bag inflator comprising, a hermetically sealed chamber containing a liquid fuel normally stored under a high pressure oxidizing environment, a brittle ceramic body in which said hermetically sealed chamber is housed, a first diaphragm partly bounding said hermetically sealed chamber, a pressure monitoring resistor situated adjacent said first diaphragm, a squib contained in said hermetically sealed chamber, and first and second externally located monitoring terminals electrically connected such that a predetermined excess of external pressure results in displacement of said first diaphragm causing electrical interconnection of the monitoring terminals via said pressure monitoring resistor, and electrical circuit means to which said pressure monitoring resistor and said squib are connected, said electrical circuit means normally having a flow of electrical current therein which is too low to ignite said squib in said hermetically sealed chamber, but having a capability of having produced therein a flow of electrical current at a predetermined level high enough to cause initiation of said squib, whereby upon combustion of the flammable mixture in said hermetically sealed chamber the high pressures generated immediately causes brittle fracture of said ceramic body with subsequent venting of the combustion products to the compressed gas air bag inflator.

20. A device as defined by claim 19 wherein said liquid fuel in said hermetically sealed chamber comprises a hydrocarbon or hydro-carbon derivative fuel.

21. A device as defined by claim 19 wherein said liquid fuel is ethyl alcohol.

22. A device as defined by claim 19 wherein said squib is a hybrid squib which incorporates therein a portion, at least, of the liquid fuel contained in said hermetically sealed chamber.

23. A device as defined by claim 19 wherein said squib is a hybrid squib which incorporates therein all of the fuel in said hermetically sealed chamber with only an oxidant otherwise being contained in said hermetically sealed chamber.

* * * * *